4 Sheets-Sheet 1.

J. Fitzgerald,

Gage Lath.

No. 319 Reissued July 17, 1855.

AM. PHOTO-LITHO. CO. N.Y. (OSBORNE'S PROCESS.)

4 Sheets-Sheet 2.

J. Fitzgerald,

Gage Lathe.

No. 319. Reissued July 17, 1855.

AM. PHOTO-LITHO. CO. N.Y. (OSBORNE'S PROCESS.)

4 Sheets-Sheet 3.

J. Fitzgerald,

Gage Lathe.

No. 319. Reissued July 17, 1855.

AM. PHOTO-LITHO. CO. N.Y. (OSBORNE'S PROCESS.)

4 Sheets-Sheet 4.

J. Fitzgerald,

Gage Lathe.

No. 319. Reissued July 17, 1855.

AM. PHOTO-LITHO. CO. N.Y. (OSBORNE'S PROCESS.)

UNITED STATES PATENT OFFICE.

D. A. FITZGERALD, OF NEW YORK, N. Y., ASSIGNEE, BY MESNE ASSIGNMENTS, OF JESSE FITZGERALD.

IMPROVEMENT IN MACHINERY FOR DRESSING TREENAILS.

Specification forming part of Letters Patent No. 6,670, dated August 28, 1849; Reissue No. 319, dated July 17, 1855.

*To all whom it may concern:*

Be it known that JESSE FITZGERALD, of the city, county, and State of New York, did invent a new and useful Machine for Making Treenails (or Trunnels) used in Ship-Building; and I hereby declare the following to be a full description of the same.

The nature and object of this invention is to cut and shape pieces of wood so as to form or make what is generally known among ship-builders as "treenails." To do this I arrange and use a series of eight or more or less cutters, as may be required, on adjustable revolving axles, so as to operate upon all sides of the piece of wood simultaneously as it passes through the machine; and in combination therewith a plate or other similar contrivance, having cams or swellings on it to regulate the form or cut of the treenail. These parts are combined with and operated and controlled by the action of a cam, guide-rods, and levers, operated by suitable propelling apparatus or gearing, for the purpose of tapering the treenail and enlarging the head thereof. This apparatus for cutting and shaping the treenail is also combined with and arranged in a suitable frame-work for adapting the several parts of the machine to work one with another by means of feed-rollers for carrying the piece of wood into and through the machine, driven by suitable gearing simultaneously with the cutting apparatus, and a self-adjusting steadying-plate to hold the end of the treenail as it is being discharged from the machine when the operation of making the treenail is completed. But to describe my invention more particularly, I will refer to the accompanying drawings, forming a part of this specification.

Figure 1:
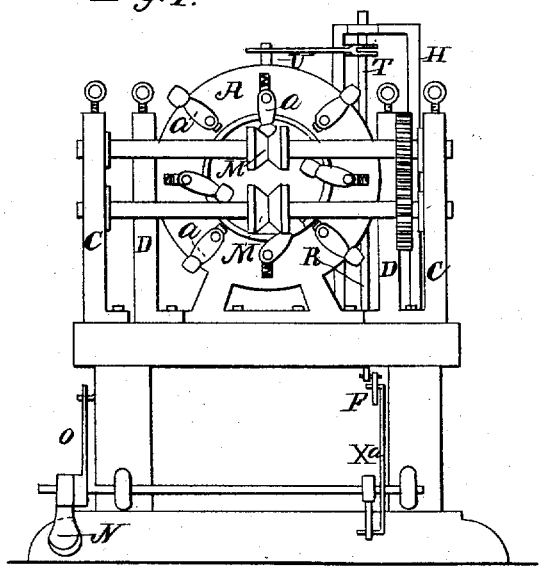

Figure 1 is a front elevation, in which A is a circular piece, (part of the frame-work,) in which are set in movable boxes the shafts I of the cutters *a;* M, a pair of rollers, which hold between them firmly and convey into the action of the cutters the piece of timber which is to be formed into the treenail. N is a pedal; C, uprights, one in each side, which hold in suitable boxes with thumb-screws the shafts of the rollers M; D, the uprights of another pair of shafts, on which are two rollers, *m*, Pl. IV, which hold firmly the treenail after it has passed the cutters; letter H, an upright support for the apparatus for enlarging the head or tapering the body of the treenail.

Figure 2:
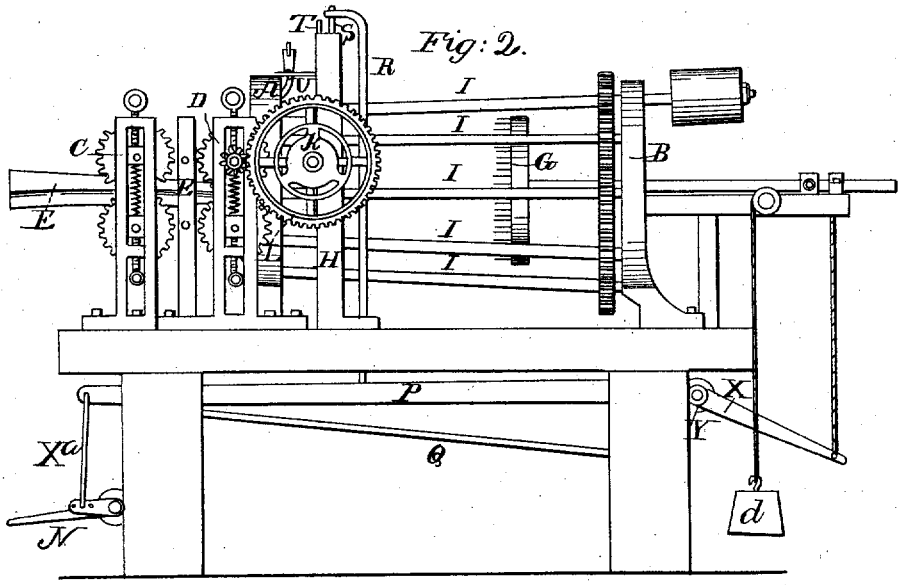

Fig. 2 is a side elevation of the machine, in which B is a circular piece (part of the frame) supporting the ends of the shafts of the cutters and pulley. At this end of the machine, on the shafts *i* of the cutters, are the connecting spur-wheels which drive the cutters. Letter G, the steadying-plate to hold the end of the treenail after it has passed through the rollers M and while the head is being finished. Upon the shaft of G, which extends back, is secured a cord and weight, *d*, which holds the disk against the end of the treenail. To release the treenail from the machine after the head of it is finished the disk is drawn back. (See apparatus, Fig. 4.)

Figure 3:
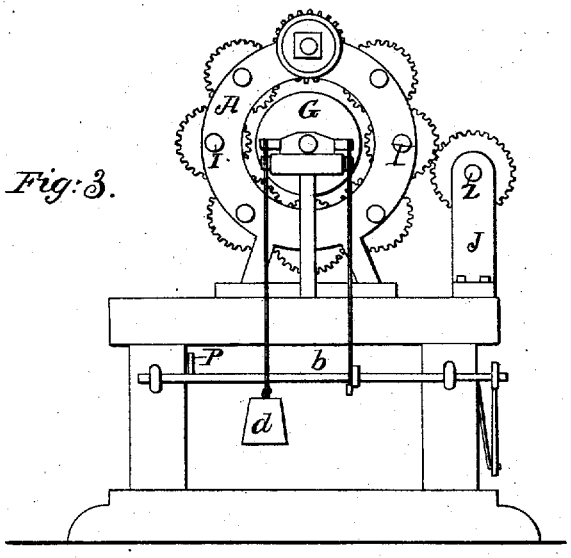

Fig. 3 is the rear end of the machine, showing the connecting gear of the shafts I, the disk G, &c.

Figure 4:
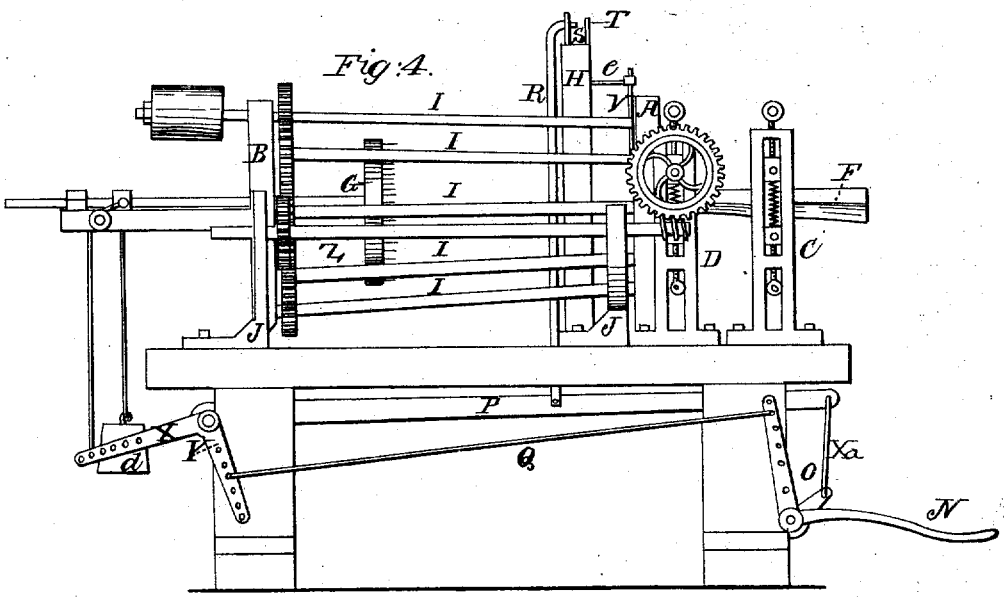

Fig. 4 is a side elevation, in which are seen the shaft Z and spur-wheel, which drives the feeding apparatus by means of an endless screw upon the end of the shaft Z, connecting with a spur-wheel upon the shaft of the rollers *m;* letter N, the pedal; O, a lever; Q, a connecting-rod, and Y X the elbow. These parts N, O, Q, Y, and X forming the apparatus for drawing the disk G back, and thereby liberating the treenail when finished.

Figure 5:
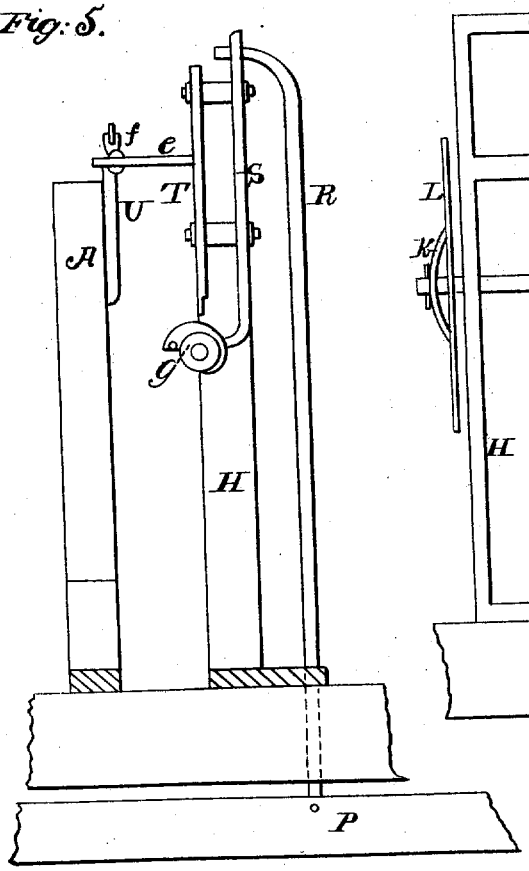
Figure 6:
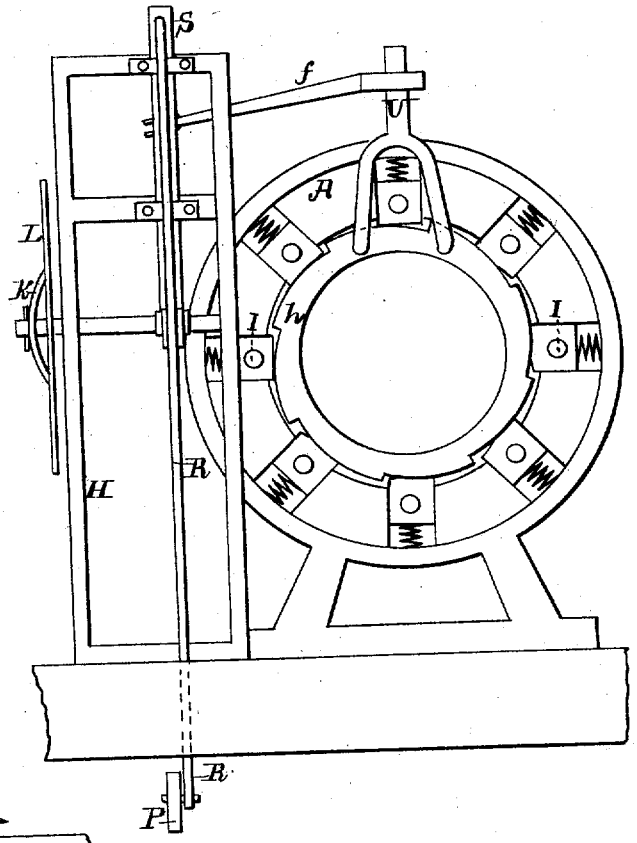

Fig. 5 is a diagram showing a vertical section of the apparatus for tapering the treenail and enlarging the head thereof. Fig. 6 is a face elevation of the same. In these diagrams, A is the circular part of the frame in front, in which the shafts I of the cutters are set. The immediate apparatus for enlarging is shown in *h*, which is a circular piece (having eight cams or swellings on the periphery) set within the piece A. The boxes of I sit upon the periphery of *h*, which, being turned a little, pushes them out from the center, thus spreading apart the cutters, the boxes being held in by spiral springs. It will be obvious that this enlarging operation may be accomplished by equivalent devices without using the precise apparatus thus described; but this I believe to be the best for the purposes described, and, therefore, for present purposes have submitted it in my model for the consideration of the Office.

Figure 7:
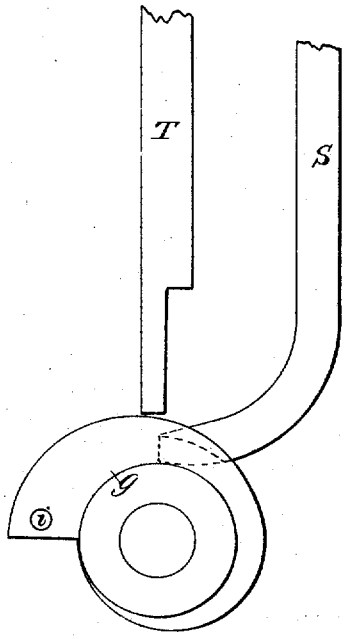

Fig. 7 is a diagram of the apparatus for tapering and enlarging the treenail at the head. Letter *g* is the cam, which makes one revolution for each treenail made. While rotating it gradually lifts up T, which, by means of an elbow, *f*, turns *h*, and throws out the cutters a little from the center. The upright and curved rod S is to meet the exigency of an unusually long treenail. When the cam has come round, the pin *i* strikes on the end of S and stops the cam, while the wheel L, Fig. 2, moves on the shaft, (held firm only by the friction against it of the cap-piece K, Fig. 2,) thus holding the cutters out until the head is completed, when the pedal N is touched, and by its apparatus brings down S, so that the cam can move on, (the pin *i* passing through an opening in the side of S, Fig. 8,) and at the same time moving back the disk G, so that the treenail will fall.

Figure 8:
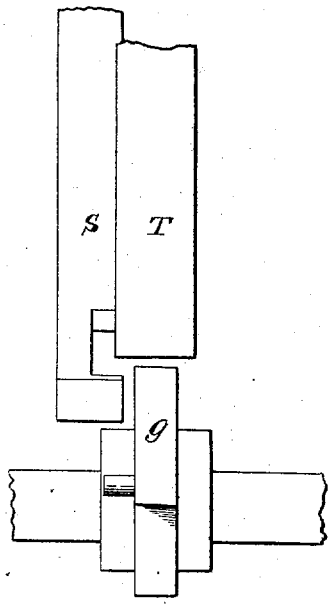
Figure 9:
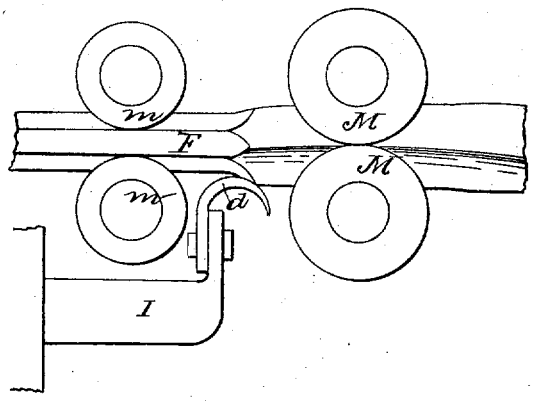
Figure 10:
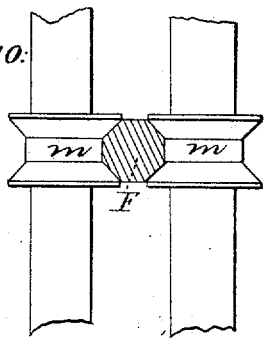

Fig. 8 is another view of the same apparatus. Fig. 9 shows the two pairs of wheels with the treenail-timber passing through and their relative position to cutter *a*; Fig. 10, the two rollers *m* and the treenail between them.

On any suitable frame I erect the supporting parts of the machine A and B, D, C, J, and H. The end supports are circular, and serve to hold in suitable boxes the shafts I, on which are the crank-cutters *a*. At the front end, A, the boxes of these shafts I are made movable, so that by being thrust out from the center, the cutters may leave the treenail with an enlarged head, or tapering gradually from end to end.

On each of the shafts I is a pinion cog-wheel. All of them are alike and connect with each other. Upon one of the shafts is the band-pulley. The shafts I must be as long as the treenail is required to be, and on the front end of it have a crank containing a slot. Upon this crank is secured the cutter *a*, its distance from the center being adjustable by means of the slot in the crank. The cutters reach as near the center as required for the size of the treenail. The pinions that gear them together are so arranged that only four of them will touch the wood at the same time. This is done by setting the cranks before the pinion-wheels are keyed to the shaft, so that four cranks are turned in toward the center, and the other four outward. Consequently by the arrangement of the gearing they move in opposite directions and do not interfere.

The feeding apparatus consists in a pinion-wheel on the shaft, Z, geared into one of the pinion-wheels of the shafts I, an endless screw on the shaft Z, which turns a cog-wheel fixed on the shaft of one of the rollers *m*. The four rollers M and *m* are geared together, so as to equalize their motion. The rollers M receive the timber and convey it steadily to the cutters. As soon as it has passed the cutters about an inch, it is seized by the two rollers *m*, which hold it steady and convey it along. These rollers are further designed to compress the treenail and render it more compact. Before the timber has passed through and left the hold of the first pair of rollers M the end of the treenail which has been finished strikes the disc, which is set with points G, and is held by it steady until it has passed through complete, when by means of the pedal N and its apparatus the disk is drawn back and the treenail falls down from the machine.

The apparatus for enlarging gradually the treenail consists of various pieces. Upon the upright support H is a horizontal shaft, on the outside end of which is a cog-wheel, L, driven by a small pinion wheel on the end of the upper shaft of roller *m*, Figs. 7 and 8. On the middle of the shaft is a cam, *g*, which turns once for each treenail. In the revolution it elevates the piece T, which, by its connection with *f* and *u*, turns around a little the ring or cam *h*, and thus presses out from the center the boxes in which are held the shafts I. There is connected with this apparatus another set of pieces for holding the cutters (when expanded) in their position until the head is finished, as is necessary, when the piece is a little too long.

There is an arm, X *a*, upon the pedal shaft, attached to a lever, P. Attached to this lever is the rod R, which runs up the rear of H, and connects with the upright piece S. This at the lower end sets near the cam *g*, and stops it, (the pin *i* striking it,) which cam is held from turning, and the cutters consequently kept expanded until by touching the pedal the lever P is pulled down, and with it, by means of R, the piece S, when the cam goes on again.

What I claim as my invention is—

The use of the cutters *a*, in combination with the enlarging and heading apparatus, or apparatus analogous thereto, when used for the purposes substantially as hereinbefore set forth; and this I claim, whether any one or more of the parts of the enlarging and heading apparatus, or apparatus analogous thereto, are used separately or collectively in combination with the said cutters, whereby treenails are cut and shaped by the use of such mechanical devices as hereinbefore substantially described.

DELIA A. FITZGERALD,
*Assignee of Jesse Fitzgerald.*

Witnesses:
CHARLES L. BARRITT,
E. A. VANDERHOFF.